United States Patent [19]
Lin

[11] Patent Number: 5,868,814
[45] Date of Patent: Feb. 9, 1999

[54] APPARATUS FOR RECIRCULATING MOLTEN GLASS

[75] Inventor: Si Yuan Lin, Bethesda, Md.

[73] Assignee: GTS Duratek, Inc., Columbia, Md.

[21] Appl. No.: 936,144

[22] Filed: Sep. 22, 1997

[51] Int. Cl.⁶ .................................................. C03B 5/193
[52] U.S. Cl. ............................ 65/178; 65/134.5; 65/346
[58] Field of Search .................................. 65/134.5, 178, 65/346

[56] References Cited

U.S. PATENT DOCUMENTS

| | | | |
|---|---|---|---|
| 1,959,417 | 5/1934 | Flexon | 65/347 |
| 2,515,478 | 7/1950 | Tooley et al. | 65/180 |
| 2,883,798 | 4/1959 | Russell | 65/495 |
| 3,015,190 | 1/1962 | Arbeit | 65/134.4 |
| 3,519,412 | 7/1970 | Olink | 75/529 |
| 3,573,895 | 4/1971 | Ostberg | 75/529 |
| 4,046,547 | 9/1977 | Pieper | 65/135.3 |
| 4,099,951 | 7/1978 | Pieper | 65/135.3 |
| 4,818,221 | 4/1989 | Besne et al. | 432/99 |
| 4,900,337 | 2/1990 | Zortea et al. | 65/125.8 |
| 5,188,649 | 2/1993 | Macedo et al. | 65/21.3 |
| 5,316,563 | 5/1994 | Ishimura et al. | 65/32.5 |
| 5,370,723 | 12/1994 | Trevelyan et al. | 65/346 |

FOREIGN PATENT DOCUMENTS 711976  2/1933  France .
001232653 A1  5/1986  U.S.S.R. .

OTHER PUBLICATIONS

"Glass and Glass Products," Mc Graw–Hill Enecyclopedia of Science & Technology, vol. 8, pp. 125–128, 1987. (No month available).

Primary Examiner—Peter Chin
Assistant Examiner—Sean Vincent
Attorney, Agent, or Firm—Edgar H. Haug, Esq.; John R. Lane, Esq.

[57] ABSTRACT

A molten glass recirculating apparatus is provided, comprising a riser chamber having a first opening positioned below a molten glass level and a second opening positioned above a molten glass level, a trough positioned adjacent the upper opening, and a gas emitter positioned within the riser chamber below a molten glass level and methods of using the same. When a gas is emitted from the gas emitter, molten glass contained within the riser chamber rises and exits the riser chamber through the second opening and along the trough. The exiting molten glass causes additional molten glass to be drawn into the riser chamber through the first opening. The invention also comprises a glass melter including a plurality of glass recirculating means, each being individually controllable to control the circulation of molten glass within a glass melter.

8 Claims, 5 Drawing Sheets

APPARATUS FOR RECIRCULATING MOLTEN GLASS

BACKGROUND OF THE INVENTION

1. Field of the Invention

This invention relates generally to a molten glass recirculating apparatus and a method of using the same, and more particularly to a molten glass recirculating apparatus that utilizes a riser chamber to circulate the molten glass in a molten glass pool, and methods of using the same.

2. Description of the Related Art

The need for agitation of molten glass in a glass melter is well known. Thus, in order to insure this agitation, an air bubbler system which is part of a patented waste vitrification system (U.S. Pat. Nos. 5,188,649 and 5,340,372, the disclosures of each of which are incorporated herein by reference) has been used widely in glass melters, such as Duramelters™. Duramelters™ are waste glass melters that utilize electric joule heating to vitrify various types of wastes. Bubblers have been used in DuraMelters™ to provide better mixing and circulation of the molten glass and better heat transfer between all portions of the glass pool, thus increasing melting rates of the glass and improving the uniformity of glass temperature in the glass pool.

Although utilizing bubblers of this type in melters increases melting rates of the glass and provides the additional benefits noted above, these conventional bubblers have certain limitations, and disadvantages. These may include splashing of molten glass on the plenum refractories and melter lid, accelerated refractory wear, difficulties in the measurement of glass melt level, and inability to stop operation of one or more of the bubblers at any time. Furthermore, bubblers are difficult to replace and maintain, especially in certain radioactive waste melters, where remote maintenance is required.

Therefore, it would be beneficial to provide a system which overcomes these drawbacks of the prior art.

OBJECTS OF THE INVENTION

Accordingly, it is an object of the invention to provide an improved method and apparatus for recirculating molten glass which facilitates mixing and homogenization of the molten glass within a glass melter.

A further object of the invention is to provide an improved method and apparatus for recirculating molten glass which facilitates heat transfer in the molten glass within a glass melter.

Yet another object of the invention is to provide an improved method and apparatus for recirculating molten glass which allows individual control in any desired portion of the glass melt.

A still further object of the invention is to provide an improved method and apparatus for recirculating molten glass in which each individual circulating means can be turned off to selectively recirculate glass in any portions of the glass melt, and to allow for replacement or repair of each circulating means.

Still other objects and advantages of the invention will in part be obvious and will in part be apparent from the specification and drawings.

SUMMARY OF THE INVENTION

The invention relates to an apparatus for transferring and circulating molten glass from the bottom of a glass pool to the surface of a glass pool, such as in a waste glass melter and methods of using the same. The circulation of this molten glass within the glass pool, among other benefits, increases the melting rate of the glass, promotes mixing and heat transfer in the glass pool, controls foaming, and provides various other advantages in processing of waste streams. The apparatus provides the advantages of conventional bubblers as well as additional benefits, while simultaneously eliminating the majority of their drawbacks. The apparatus is simple to build, maintain, and replace which is desirable in all waste glass melters, but especially in those melters that may have to be remotely maintained.

In accordance with the invention, at least one "riser chamber" is positioned close to the glass melting pool, e.g., located either at a wall or center of a glass melting pool. Several riser chambers may be utilized within one glass melting pool, and may be strategically placed according to the desired effect. For example, one riser may be disposed in the center of the glass melting pool, while another may be disposed near a wall of the glass melting pool. Each riser chamber recirculates the molten glass from the bottom of the glass melting pool to the top surface thereof.

In accordance with the invention, the riser chamber comprises a liner formed of a vertical pipe which allows gas to be emitted inside and at the bottom of the riser chamber. The riser chamber liner may be formed of a pipe of a corrosion-proof material, or may alternatively be formed as a square, vertical passage of a corrosion-proof material. A compressed air pipe (or pipe supplying another gas) is positioned within the riser chamber to allow gas emission adjacent the bottom portion of the chamber. The riser chamber defines one opening at the bottom of the riser chamber below the molten glass level to allow molten glass to flow into the riser chamber from the glass melting pool and a second opening at the top of the riser chamber above the molten glass level which allows molten glass to flow back into the melting pool from the riser chamber. The compressed air emitted by the compressed air pipe mixes with the molten glass, thereby reducing the density, and aerating the glass within the riser chamber. This reduced density glass and air elevate and carry the molten glass up through and out of the top opening of the riser chamber where it then overflows and returns into the glass melting pool via a connecting trough, which is positioned above the level of the molten glass pool. The position of the trough is preferably adjustable. The opening at the bottom of the riser chamber allows molten glass in the melting pool to flow into the riser chamber when the reduced density glass exits the riser at the top opening. Thus, a circulation pump is formed by the riser chamber and the rising gas. This opening also allows the glass level between the riser chamber and the glass melting pool to equalize when gas is not being emitted into the riser chamber.

The upper end of the riser chamber, which defines the top opening, is maintained in fluid communication with the melting pool by the trough which is downwardly slanted from the top hole of the riser chamber toward the melting pool. This trough allows the molten glass from the top of the riser to flow back into the melting pool.

As gas is introduced into the bottom of the riser, the compressed gas elevates and carries molten glass up through and out of the riser chamber through the trough and into the melting pool. That is, when the compressed air is emitted into the riser chamber, the glass flows up with the air bubbles. When the molten glass in the riser chamber flows into the trough at the top of the riser chamber, the glass is discharged back into the top of the glass melting pool. At the same time, the glass in the glass melting pool is drawn into the riser chamber through the bottom opening as a result of the density change and the loss of molten glass from the riser chamber through the opening at the top thereof. As a result, a pumping action is created. The molten glass is pumped into the bottom of the riser chamber and out of the top uniformly and continuously. The molten glass is advantageously mixed and homogenized as a result of the glass recirculation.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF CERTAIN PREFERRED EMBODIMENTS

Figure 1:
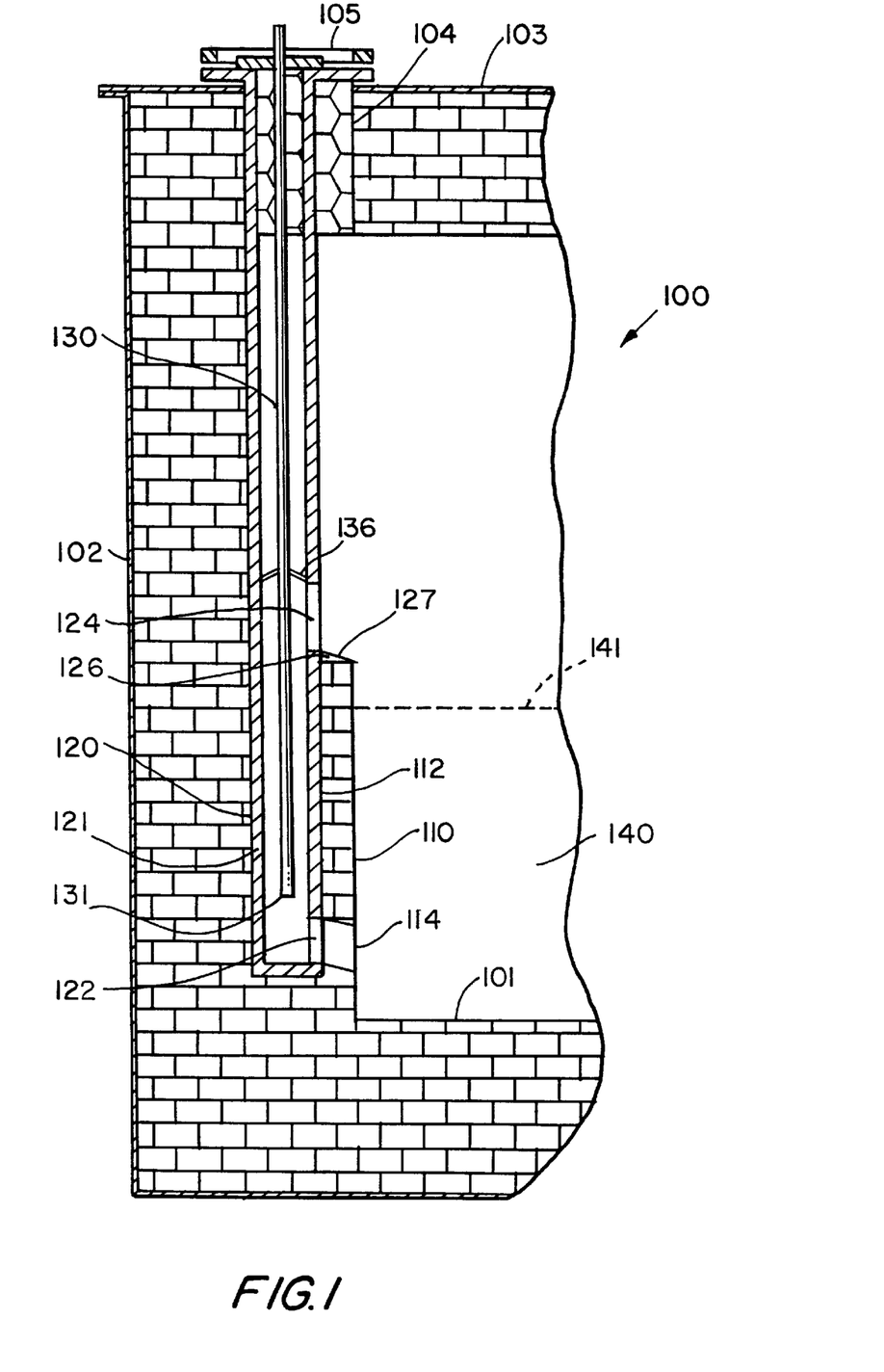
FIG. 1 is a cross-sectional elevational view of a preferred embodiment of a molten glass recirculating apparatus located within a wall of a glass melter constructed in accordance with the teachings of the present invention.

Referring first to FIG. 1, a portion of a glass melter, indicated generally at 100, is provided which is constructed in accordance with a preferred embodiment of the present invention. Glass melter 100 further comprises a bottom surface 101, a vertical wall 102 and a top wall 103. Not shown is a second vertical wall parallel to vertical wall 102, thereby forming an enclosed rectangular structure in which to melt and house molten glass. Top wall 103 may be formed as a removable lid, or alternatively, may be a formed as a permanent structure with access provided therethrough. A molten glass pool 140, while in use, is maintained with a molten glass level 141.

A vertically extending wall 110 is provided adjacent vertical wall 102, which extends vertically from bottom surface 101 of glass melter 100. Vertically extending wall 110 forms a rectangular enclosure, three sides thereof being formed by vertical wall 102, and a fourth side thereof being formed by vertical side wall 110. Thus, vertical wall 110 along with a portion of vertical wall 102 defines a vertical extending space 112. Vertically extending wall 110 further defines an opening 114 positioned adjacent a bottom portion thereof. Also shown in FIG. 1, top wall 103 of glass melter 100 defines an opening 104 which is sealed by an opening lid 105.

Vertical extending space 112 and opening 104 aid in defining a riser chamber 120. Riser chamber 120 may be formed of any vertically extending shape, but in a preferred embodiment is formed with a square or rectangular cross section. A vertical riser liner 121 is positioned within riser chamber 120 and extends from a bottom portion thereof to a position adjacent opening lid 105. Vertical riser liner 121 is formed in a shape which conforms to the shape of riser chamber 120. Vertical riser liner 121 may be formed of any material which is resistant to heat and corrosion, and is approved for use within a molten glass bed. In a preferred embodiment, this riser is formed of an inconel metal, or other refractory material.

Vertical riser liner 121 further defines an opening 122 adjacent the bottom portion thereof. Opening 122 corresponds in its position to opening 114 defined by vertically extending wall 110, and so places the interior of riser chamber 120 in fluid communication with the interior of glass melter 100 and glass pool 140, and is positioned below molten glass level 141.

Vertical riser liner 121 further defines an upper opening 124 which is positioned adjacent, although above, the top edge of vertically extending wall 110, and is also maintained above molten glass level 141. A trough 126 is provided adjacent a lower edge of upper opening 124 and is fixed to vertical riser liner 121. In an alternative embodiment, the position of the trough may be adjustable. A top edge of trough 126 is positioned coplanar with a portion of vertical riser liner 121 defining the lower edge of upper opening 124, and a lower surface of trough 126 is formed coplanar with a top surface of vertically extending wall 110. An inclined surface 127 of trough 126 extends from opening 124 over the top surface of vertically extending wall 110, and overhangs glass pool 140 above molten glass level 141 within the interior of glass melter 100. Vertical riser liner 121 is further adapted to be locked into position by the attachment of opening lid 105 to top wall 103 of glass melter 100.

A compressed air pipe 130 is provided in the interior of riser chamber 120. Similar to vertical riser liner 121, compressed air pipe 130 may be formed of an inconel metal or other refractory material which is resistant to heat damage and corrosion. A proximal end of compressed air pipe 130 passes through opening lid 105, and down through riser chamber 120. A distal end 131 of compressed air pipe 130 is positioned adjacent the bottom of riser chamber 120 and opening 122 of vertical riser liner 121, but is positioned slightly above opening 122.

Finally, an optional splash guard 136 may be provided surrounding compressed air pipe 130, in order to keep any molten glass splashing thereabove. This splash guard 136 may similarly be formed of an inconel metal or other refractory material, and may be welded to compressed air pipe 130 only, to the interior of vertical riser liner 121 only, or to both simultaneously. Splash guard 136 is positioned above upper opening 124.

When compressed air pipe 130 is not positioned within riser chamber 120, and compressed air is not being emitted from distal end 131 of compressed air pipe 130, the level of molten glass within riser chamber 120 is the same as molten glass level 141. During use, compressed air or other gas is emitted from distal end 131 of compressed air pipe 130. This compressed air is emitted into molten glass which has entered riser chamber 120 through opening 122 in vertical riser liner 121, and opening 114 in vertically extending wall 110. The bottom of riser chamber 120, opening 122 of vertical riser liner 121, opening 114, and end portion 131 of compressed air pipe 130 must always be positioned below the level of molten glass 141. When this compressed air or other gas is emitted within the molten glass at the bottom of riser chamber 120, bubbles form in the molten glass. This addition of air within the molten glass results in a reduction in the apparent density of the molten glass in the region at the bottom of riser chamber 120. This reduction in the apparent density of the molten glass in this region causes this portion of molten glass to rise through riser chamber 120, and increase the level above molten glass level 141. The molten glass level within riser chamber 120 rises enough so that molten glass therefrom passes through upper opening 124 of vertical riser liner 121, into trough 126 and down inclined face 127 thereof, whereby the molten glass is returned to the main interior portion of glass melter 100 and molten glass pool 140.

Thus, riser chamber 120 acts as a molten glass pump by collecting glass melt from the bottom of the melter and glass pool 140, and discharging the molten glass at the top surface thereof. While trough 126 is shown as merely allowing the glass to flow back to glass level 141 on the immediately opposite side of vertically extending wall 110, it would be possible to transport this glass to any location necessary within glass melter 100, thereby further aiding in circulation of molten glass with glass meter 100.

Thus, as molten glass is raised in riser 120 through the apparent decrease in density, and glass pours over trough 126 back to molten glass pool 140, additional molten glass from the bottom of the main portion of molten glass pool 140 is drawn into riser chamber 120 through opening 122 in vertical riser liner 121, and opening 114 formed in vertically extending wall 110. Therefore, in this manner, it is possible to provide circulation in a glass melter, without providing gas bubbles within the main portion of the tank, thereby resulting in a fluctuating glass level, and without risking the splashing of molten glass around the internal portion of the glass melter.

During use, splash guard 136 insures that any splashes occurring as a result of air bubbles rising through the molten glass do not splash upon the inside surface of lid 103, or any other portion of glass melter 100. Additionally, splash guard 136 aids in increasing the air pressure within riser chamber 120, thereby aiding in the density alteration by the emitted gas.

During a cleaning, or replacement operation, opening lid 105 is removed, and thereafter, compressed air tube 130 is removed from riser chamber 120. Alternatively, the entirety of vertical riser liner 121, including compressed air tube 130 may be removed from within riser chamber 120. For this purpose, opening 104 in top surface 103 is provided wide enough to accommodate the passage of vertical riser liner 121 and trough 126, which is fixed thereto. Additionally, it is possible to turn off a particular riser chamber as desired, even while glass melter 100 is functioning, simply by stopping the supply of compressed air.

Figure 2:
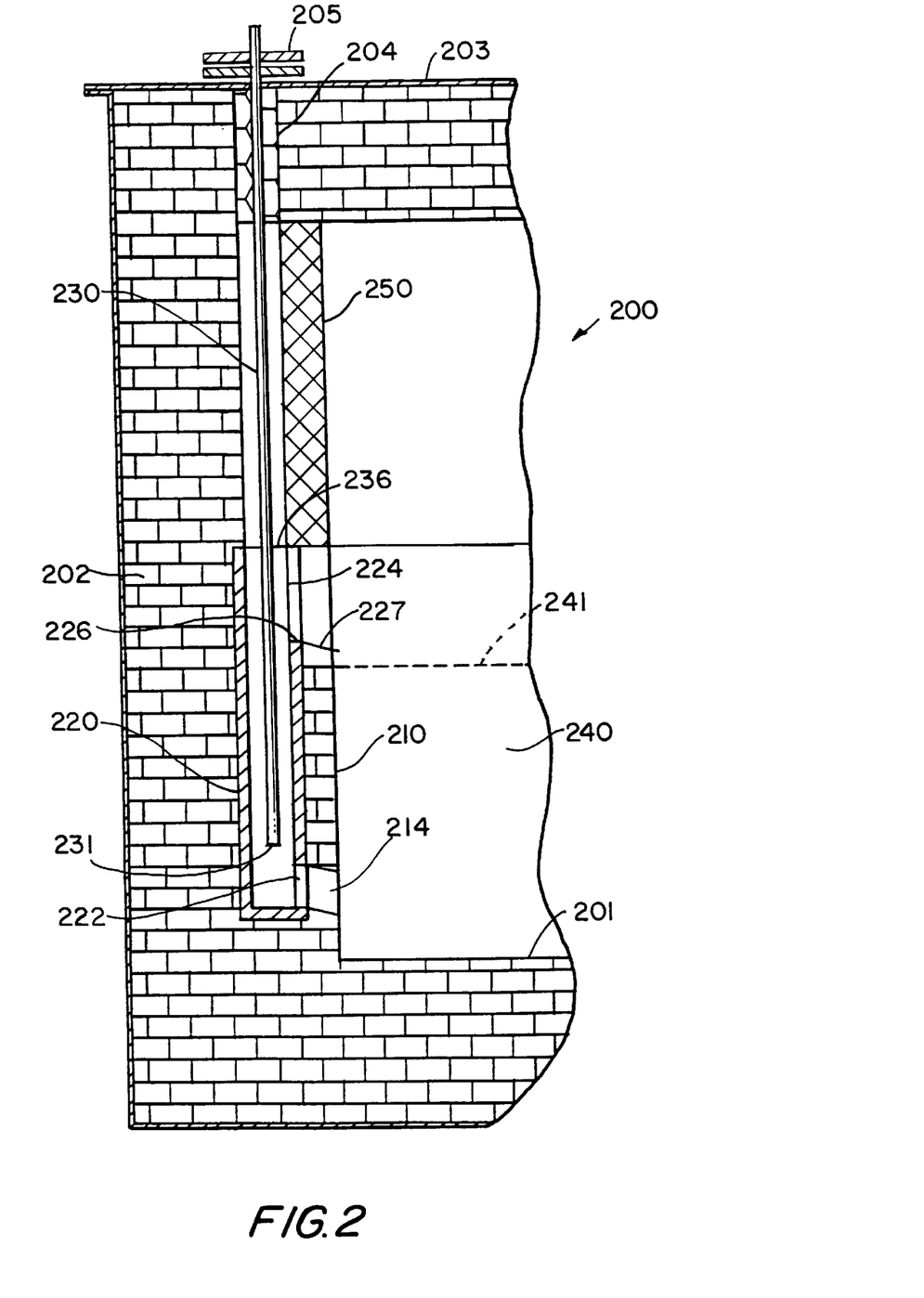
FIG. 2 is a cross-sectional elevational view of another preferred embodiment of a molten glass recirculating apparatus located within a wall of a glass melter constructed in accordance with the teachings of the present invention.

Referring next to FIG. 2, a glass melter 200, constructed in accordance with a second embodiment of the invention is illustrated. Glass melter 200 is constructed similarly to glass melter 100, reference numerals depicting similar elements to that of the first embodiment are denoted by reference numbers beginning with 2, but containing corresponding last two digits. Glass melter 200 contains walls 201, 202, 203, an opening 204 and a lid 205, all of which are similar to their counterparts depicted in FIG. 1. A vertically extending wall 210 is formed similarly to vertical partitioning wall 110 and defines an opening 214 formed therein. A partition wall 250 extends downward from top surface 203 in a position opposite vertically extending wall 210. A riser chamber 220 is defined by vertically extending wall 210, partition wall 250 and wall 202. A half riser liner 221 is fitted within riser chamber 220 at a lower portion thereof. Half riser liner 221 extends only a portion of the way up riser chamber 220 towards upper wall 203 of glass melter 200, and is positioned to be permanently embedded therein. Thus, half riser liner 221 fits into an indentation of wall 202. Additionally, partition wall 250 extending downward from top wall 203 has a width similar to the combined width of vertically extending wall 210, and a wall of vertical riser 220, and would further impede the movement of half riser liner 221. An upper opening 224 is defined between the top edge of half riser liner 221 and partition wall 250. Similar to the first embodiment, a trough 226 is provided fixed to half riser liner 221 with an inclined surface 227, which is positioned above the level 241 of molten glass 240. An optional splash guard 236 may also be provided.

During operation, the functioning is similar to that of the apparatus set forth in FIG. 1. However, in using this apparatus, it is only possible to remove compressed air pipe 230, and it is not possible to remove half riser liner 221. Therefore, for replacement or cleaning, it is only possible to exchange or remove compressed air tube 230. While this allows for a changing of the compressed air tube, and for turning off the circulator, it is not possible to easily change vertical riser 220. However, since the amount of material required for riser liner 221 is reduced, the cost of implementation of this embodiment is also reduced.

Figure 3:
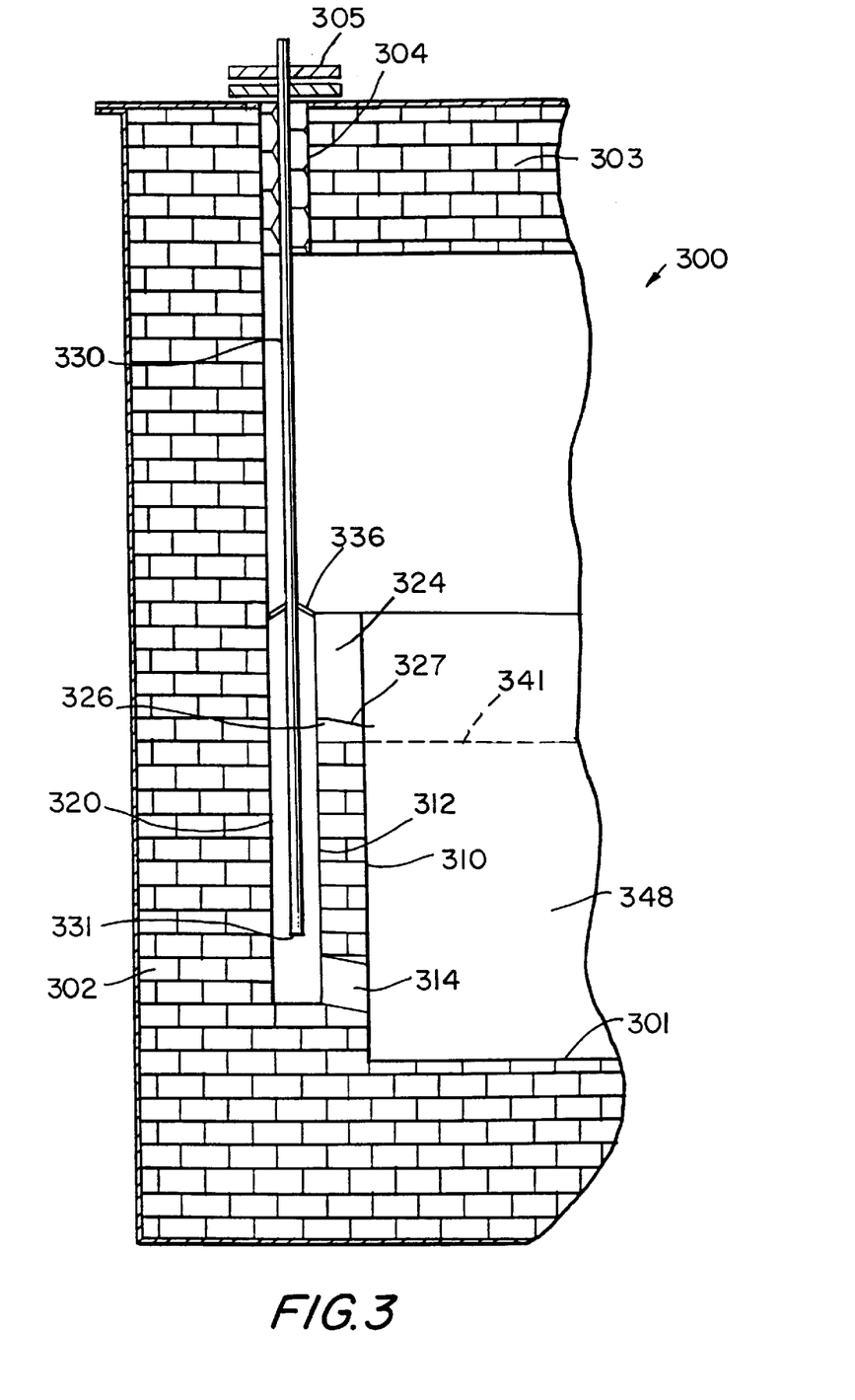
FIG. 3 is a cross-sectional elevational view of yet another preferred embodiment of a molten glass recirculating apparatus located within a wall of a glass melter constructed in accordance with the teachings of the present invention.

Reference is next made to FIG. 3, which depicts a glass melter, indicated generally as 300, constructed in accordance with a third embodiment of the invention. Reference numerals in this embodiment depicting similar elements to those of the first two embodiments are denoted by reference numbers beginning with 3, but contain corresponding last two digits.

Glass melter 300 operates similarly to glass melter 200, with the exception that no specific internal metal or refractory material riser liner is employed. Rather, a riser chamber 320 is defined by the space provided between a vertically extending wall 310, a bottom wall 301, and a vertical side wall 302. Vertically extending wall 310 is provided with a space 314 at the bottom portion thereof. In the third embodiment as shown, a splash guard 336 is optionally employed and is fixed to compressed air pipe 330. A trough 326 is fixed to an upper edge of vertically extending wall 310.

During operation, and cleaning, this embodiment depicted in FIG. 3 operates similarly to that depicted in FIG. 2, but only compressed air pipe 330 may be removed, and opening 304 need only be wide enough to accommodate compressed air pipe 330, and splash guard 336, if employed.

Figure 4:
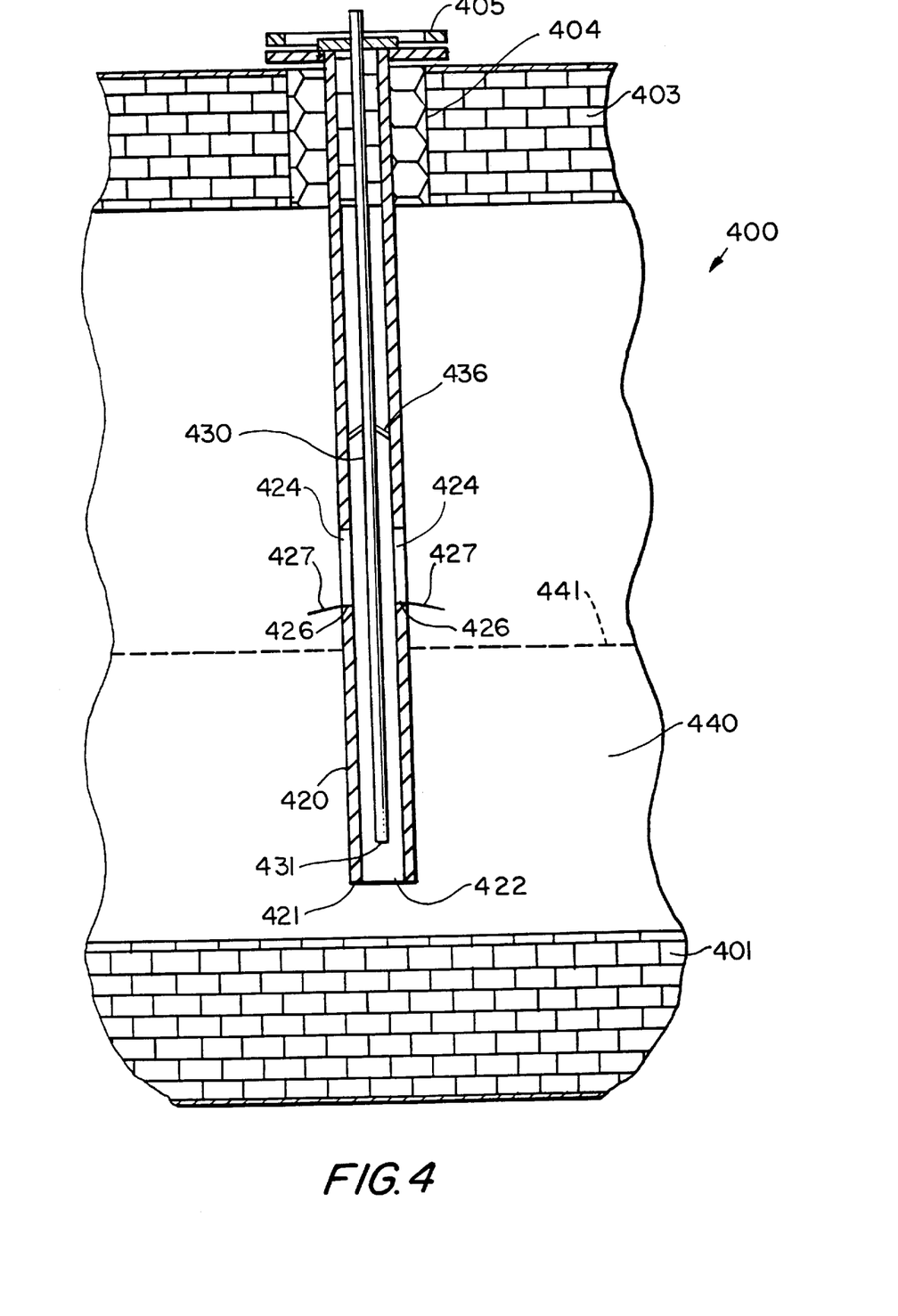
FIG. 4 is a cross-sectional elevational view of still another preferred embodiment of a molten glass recirculating apparatus inserted through the lid of a glass melter constructed in accordance with a the teachings of the present invention.

Reference is next made to FIG. 4 which depicts another preferred embodiment of a glass melter, generally designated by reference number 400 in accordance with the teachings of the present invention. Glass melter 400 is formed with a bottom wall 401, a top wall 403, a through hole 404 defined by top wall 403 and a lid 405 for sealing through hole 404. Glass melter 400 is also formed with left and right vertical side walls, which are not shown in FIG. 4. Molten glass pool 440 is maintained in an interior of glass melter 400, molten glass 440 having a level 441. A vertical riser liner 420 forms a riser chamber, and is passed through hole 404 in top wall 403 of glass melter 400. A bottom portion 421 of vertical riser liner 420 is positioned below molten glass level 441. As in the prior embodiments, vertical riser liner 420 may be formed of an inconel metal, or other refractory material. Vertical riser liner 420 defines a lower opening 422 at bottom portion 421 thereof, opening 422 always being positioned below molten glass level 441. Vertical riser liner 420 further defines upper openings 424 which are positioned above molten glass level 441. Finally, vertical riser liner 420 is provided with a trough 426, one trough 426 for each opening 424. Each of the troughs 426 has an inclined face 427, each functioning similarly to trough 126 described with respect to the first embodiment. Each trough is maintained above molten glass level 441.

A compressed air pipe 430 is formed with an optional splash guard 436, and is similar in structure to compressed air pipe 130. Compressed air pipe 430 is positioned within vertical riser liner 420, and is fixed in its position by lid 405. Therefore, none of vertical riser liner 420, or any of the other pieces of the apparatus are in contact with any walls of glass melter 400, other than top wall 403.

During operation, compressed air or other gas is fed through compressed air tube 430, which is emitted into the molten glass of molten glass pool 440 contained within vertical riser liner 420. As noted with respect to the first embodiment, this emission of air or gas reduces the density of the molten glass within vertical riser liner 420, which then aids the molten glass in rising up above the level of opening 424, and allows the molten glass to flow via troughs 426 back into molten glass 440. This exiting molten glass forms a vacuum within vertical riser liner 420, and molten glass from the bottom of molten glass pool 440 is drawn into vertical riser liner 420 via bottom opening 422. Therefore, as noted with respect to FIG. 1, vertical riser liner 420 and accompanying apparatus act as a glass pump, moving molten glass from a lower portion of molten glass pool 440 to the upper surface thereof.

Glass melter 400 provides similar benefits to glass melters 100, 200 and 300 of the prior embodiments. However, it is possible to position vertical riser liner 420 of glass melter 400 in the interior area of a glass melter, and it is not necessary to position the apparatus adjacent a wall of the glass melter. Thus, with this additional positioning freedom, strategic positioning of this circulation pump can be ensured.

During removal, it is possible to detach lid 405, and remove vertical riser 420, along with compressed air pipe 430, to therefore stop the pumping action at this position in glass melter 400. If vertical riser liner 420 is to be removed entirely, opening 404 must be wide enough to accommodate troughs 426, which are fixed to vertical riser liner 420. Because of the positioning of splash guard 436, it may be necessary to weld this stopper to both compressed air tube 430, and the internal surface of riser 420, thereby forming a fixed piece. Alternatively, it is possible to provide splash guard 436 fixed only to either compressed air tube 430, or vertical riser 420, thereby allowing for the removal of compressed air tube 430 without the removal of riser 420, or for the removal of both together. By allowing removal of either one of, or both of compressed tube 430 and riser 420, the functioning of the glass circulator pump type apparatus may be stopped, when necessary, and the adjustment and replacement thereof may be performed far more easily.

Figure 5:
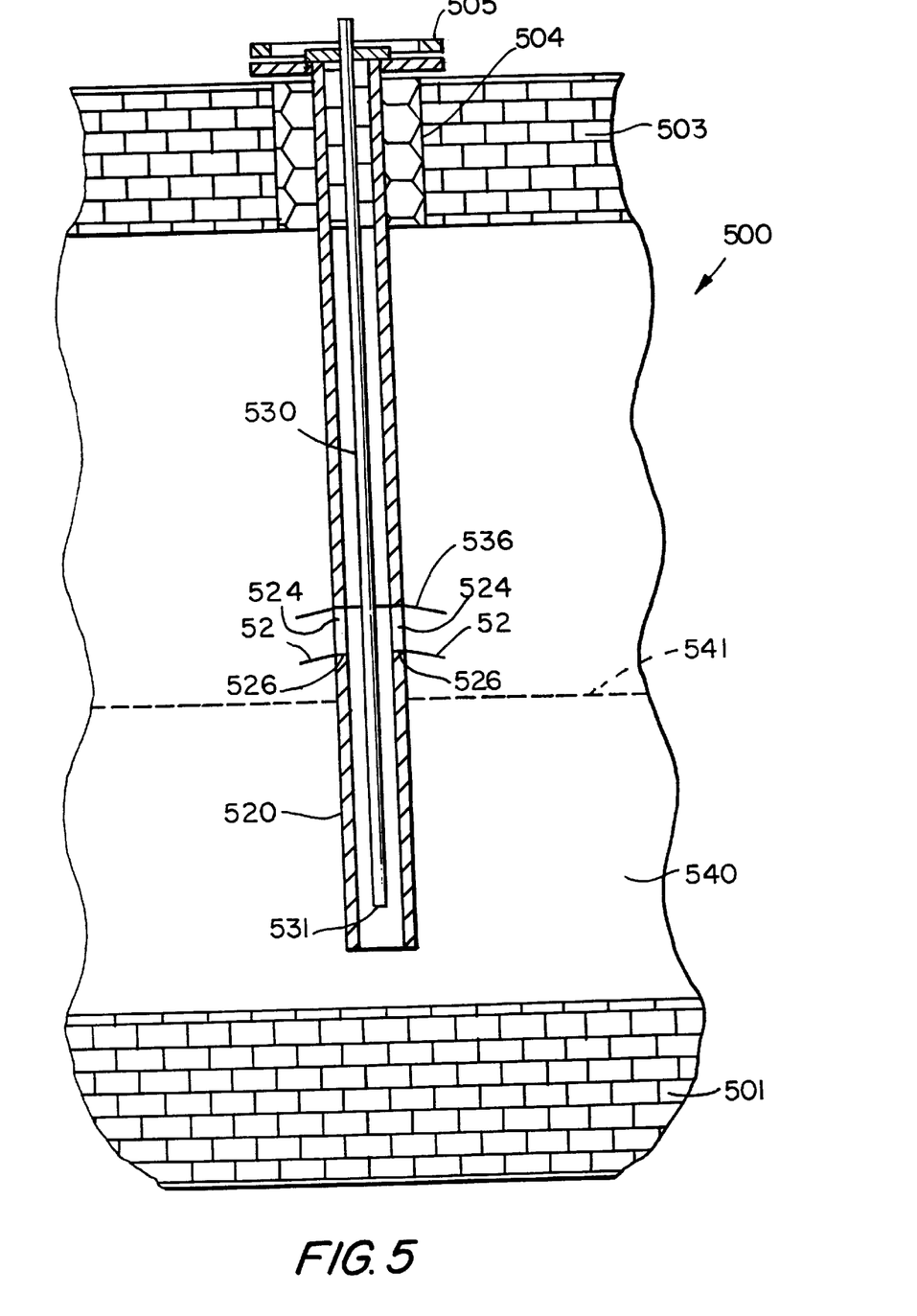
FIG. 5 is a cross-sectional elevational view of a further preferred embodiment of a molten glass recirculating apparatus inserted through the lid of a glass melter constructed in accordance with the teachings of the present invention.

Reference is next made to FIG. 5, which depicts a glass melter, generally indicated at 500, which is constructed in accordance with a fifth embodiment of the invention. Glass melter 500 is constructed similarly to glass melter 400, the difference being that a splash guard 536 extends beyond the boundaries of vertical riser liner 520. In this manner, similar to that of FIG. 4, it is possible to provide splash guard 536 fixed to either vertical riser 520, compressed air tube 530, or to both vertical riser 520 and compressed air tube 530. All functioning of the apparatus depicted in FIG. 5, including during use and removal and repair, is similar to that depicted with respect to FIG. 4.

In accordance with an additional aspect of the invention, it is possible to provide a glass melter utilizing any combination of the specific apparatus described in the above-referenced embodiments. Therefore, for example, it would be possible to have one or more risers, such as those depicted in FIGS. 1–3 in various walls of a glass melter, and additionally, risers, such as those depicted in FIGS. 4–5, in central portions of a glass melter, away from the walls. By providing a plurality of these risers, it would be possible to provide adequate mixing of the molten glass throughout the glass melter. Additionally, because it is possible to independently control each of the risers, depending on temperature gradients required, or any other factors, it would be possible to remove and turn off various of the risers at the same time or different times, as desired, in order to generate a desired effect. It would also be possible to control the flow of gas through each riser in order to adjust the level of circulation at each location, independently, as desired. In this manner, in accordance with the present invention, greater control regarding the status and operation of a glass melter is provided.

Any of the apparatus constructed in accordance with the invention will enhance processing rates of the glass in waste glass mixers by promoting mixing, homogenization and aeration of the glass melt, thus promoting heat transfer and increasing melting rates.

Any of the apparatus constructed in accordance with the invention can be used to transfer glass melt from the bottom of the melt pool to the surface thereof. This promotes mixing and heat transfer, and helps maintain a uniform temperature in the glass melt pool. Alternatively, the location and operation of any member of the apparatus may be controlled to obtain advantageous temperature gradients in the melter. In addition, the apparatus may be used to maintain the plenum temperature within specified ranges.

Thus, in accordance with the invention, the apparatus may be used to transfer heat from most any location in the melter to any other location. Therefore, electrodes can be used as the sole source of power during melter operation. Lid heaters may be needed only during start-up. If alternate energy sources (e.g. natural gas) are utilized during start-up, lid heaters can completely be removed from waste glass melters.

Compared to agitation of the melt pool utilizing conventional bubblers, agitation according to the invention is less vigorous. As a consequence the glass level stays relatively steady during operation which makes measurement and control of glass level easier. Additionally, during operation of conventional bubblers molten glass may be splashed on plenum refractory, and occasionally on the lid. This may lead to degradation of various components that may come in contact with the molten glass, and may lead to contamination of the molten glass pool. Since the mixing action of the new device is less vigorous, the glass splashing problem can be eliminated.

As noted, one or more of the apparatus of the invention may be placed in different locations in the melter. One or more of these devices may be operated at any given time depending on specific temperature and glass flow profiles that are needed. This is an advantage over conventional bubblers, which must all be operational at all times.

In waste glass melters utilizing conventional bubblers an increase in rate of bubbling can frequently be used to increase throughput. One drawback of this approach is that the refractory corrosion rates may also increase. In accordance with the invention, molten glass re-circulation rate can be increased to enhance throughput without adversely affecting refractory life. This can be accomplished by carefully selecting the molten glass intake and discharge locations and rates to minimize agitation, and glass flow at or near the glass-refractory interface.

In accordance with the invention, pipe for supplying compressed gas to the apparatus is the only part of the device that penetrates the melter lid. Since the apparatus in accordance with the invention can be removed while the glass melter is still in use, or the pumping action can be stopped by simply turning off the compressed air supply, the apparatus is simpler to maintain, than conventional glass melters with conventional bubblers, especially in a remote maintenance environment.

One of the process limiting steps in the vitrification of wastes utilizing conventional hardware is the formation of a thick cold-cap on the melt surface. In accordance with the invention, by continuously recirculating molten glass from the bottom of the melter to the surface of the glass pool during feeding, cold-cap formation is inhibited.

Foaming of the glass melt is a problem that is frequently encountered during waste processing when utilizing conventional hardware. This foaming may be due to solubility limits of gases, and redox equilibria of multivalent ions in the melt that change constantly during heating and cooling of the melt. In accordance with the invention, by recirculating molten glass from the bottom of the melter to the surface of the melt pool, foaming of the glass melt may be avoided. Additionally, this circulation of glass melt can be used to control temperatures, and temperature gradients within the glass pool.

Accumulation of noble metals and other heavy secondary phases is a problem encountered in a number of waste glass melters utilizing conventional hardware. In accordance with the invention, this problem of accumulation of noble metals may be controlled by recirculating glass from the bottom of the melt pool to the top, thus reducing the accumulation of secondary phases on the melt bottom.

It will thus be seen that the objects set forth above, among those made apparent from the preceding description, are officially attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A molten glass recirculating apparatus, comprising:
   a glass melting zone having molten glass contained therein rising to a molten glass level;
   a riser chamber proximate to said glass melting zone, said riser chamber defining a first opening positioned below the molten glass level, and a second opening positioned above the molten glass level, wherein said riser chamber is formed with a liner;
   a trough, positioned adjacent said second opening, connecting said second opening of said riser chamber and said glass melting zone; and
   a gas emitter positioned within said riser chamber below the molten glass level to promote an upwardly rising flow within said riser chamber such that said molten glass is distributed through said second opening to said glass melting zone via said trough.

2. A molten glass recirculating apparatus, comprising:
   a glass melting zone having molten glass contained therein rising to a molten glass level;
   a riser chamber proximate to said glass melting zone, said riser chamber defining a first opening positioned below the molten glass level, and a second opening positioned above the molten glass level, wherein said riser chamber is formed with a liner of a refractory material;
   a trough, positioned adjacent said second opening, connecting said second opening of said riser chamber and said glass melting zone; and
   a gas emitter positioned within said riser chamber below the molten glass level to promote an upwardly rising flow within said riser chamber such that said molten glass is distributed through said second opening to said glass melting zone via said trough.

3. A molten glass recirculating apparatus, comprising:
   a glass melting zone having molten glass contained therein rising to a molten glass level;
   a riser chamber proximate to said glass melting zone, said riser chamber defining a first opening positioned below the molten glass level, and a second opening positioned above the molten glass level, wherein said riser chamber is removable from a glass melter within which it is positioned;
   a trough, positioned adjacent said second opening, connecting said second opening of said riser chamber and said glass melting zone; and
   a gas emitter positioned within said riser chamber below the molten glass level to promote an upwardly rising flow within said riser chamber such that said molten glass is distributed through said second opening to said glass melting zone via said trough.

4. The molten glass recirculating apparatus of claim 3, wherein said gas emitter is removable in conjunction with said riser changer.

5. A molten glass recirculating apparatus, comprising:
   a glass melting zone having molten glass contained therein rising to a molten glass level;
   a riser chamber proximate to said glass melting zone, said riser chamber defining a first opening positioned below the molten glass level, and a second opening positioned above the molten glass level;
   a trough, positioned adjacent said second opening, connecting said second opening of said riser chamber and said glass melting zone; and
   a gas emitter positioned within said riser chamber below the molten glass level to promote an upwardly rising flow within said riser chamber such that said molten glass is distributed through said second opening to said glass melting zone via said trough, wherein said gas emitter is removable from said riser chamber.

6. A molten glass recirculating apparatus, comprising:
   a glass melting zone having molten glass contained therein rising to a molten glass level;
   a riser chamber proximate to said glass melting zone, said riser chamber defining a first opening positioned below the molten glass level, and a second opening positioned above the molten glass level, wherein said riser chamber extends from a lid of a glass melter to a lower portion of said glass chamber;

a trough, positioned adjacent said second opening, connecting said second opening of said riser chamber and said glass melting zone; and a gas emitter positioned within said riser chamber below the molten glass level to promote an upwardly rising flow within said riser chamber such that said molten glass is distributed through said second opening to said glass melting zone via said trough.

7. A molten glass recirculating apparatus, comprising:

a glass melting zone having molten glass contained therein rising to a molten glass level;

a riser chamber proximate to said glass melting zone, said riser chamber defining a first opening positioned below the molten glass level, and a second opening positioned above the molten glass level, wherein a riser chamber liner extends only a portion of the distance from a bottom surface of a glass melter to a lid thereof;

a trough, positioned adjacent said second opening, connecting said second opening of said riser chamber and said glass melting zone; and a gas emitter positioned within said riser chamber below the molten glass level to promote an upwardly rising flow within said riser chamber such that said molten glass is distributed through said second opening to said glass melting zone via said trough.

8. A molten glass recirculator apparatus, comprising:

a glass melting zone having molten glass contained therein rising to a molten glass level;

a riser chamber proximate to said glass melting zone, said riser chamber defining a first opening positioned below the molten glass level, and a second opening positioned above the molten glass level;

a trough, positioned adjacent said second opening, connecting said second opening of said riser chamber and said glass melting zone;

a gas emitter positioned within said riser chamber below the molten glass level to promote an upwardly rising flow within said riser chamber such that said molten glass is distributed through said second opening to said glass melting zone via said trough; and a splash guard positioned within said riser chamber, at a position above said second opening.

* * * * *